United States Patent
Lee

(10) Patent No.: US 7,645,044 B2
(45) Date of Patent: Jan. 12, 2010

(54) ASSEMBLY STRUCTURE OF SIDE MIRROR FOR AUTOMOBILE

(75) Inventor: Kun Hwan Lee, Gyeonggi-do (KR)

(73) Assignee: Actronics Co., Ltd. (KR)

( * ) Notice: Subject to any disclaimer, the term of this patent is extended or adjusted under 35 U.S.C. 154(b) by 0 days.

(21) Appl. No.: 12/298,362

(22) PCT Filed: Oct. 30, 2006

(86) PCT No.: PCT/KR2006/004443

§ 371 (c)(1),
(2), (4) Date: Oct. 24, 2008

(87) PCT Pub. No.: WO2007/126190

PCT Pub. Date: Nov. 8, 2007

(65) Prior Publication Data

US 2009/0091852 A1     Apr. 9, 2009

(30) Foreign Application Priority Data

May 2, 2006   (KR) ................. 20-2006-0011715 U

(51) Int. Cl.
*B60R 1/06* (2006.01)
(52) U.S. Cl. .................. 359/876; 359/872; 248/487
(58) Field of Classification Search ......... 359/871–877; 248/475.1–487
See application file for complete search history.

(56) References Cited

U.S. PATENT DOCUMENTS

| | | | | |
|---|---|---|---|---|
| 4,693,571 A * | 9/1987 | Kimura et al. | ............... | 359/874 |
| 4,818,090 A * | 4/1989 | Righi | ............... | 359/874 |
| 4,981,279 A * | 1/1991 | Andreas et al. | ............... | 248/483 |
| 5,938,166 A * | 8/1999 | Seichter et al. | ............... | 248/479 |
| 5,946,151 A * | 8/1999 | Levko | ............... | 359/872 |
| 5,969,891 A * | 10/1999 | Otenio et al. | ............... | 359/871 |
| 6,168,279 B1 * | 1/2001 | Schnell | ............... | 359/872 |
| 6,971,757 B2 * | 12/2005 | Ro | ............... | 359/879 |
| 2004/0227049 A1 * | 11/2004 | Lang et al. | ............... | 248/476 |

* cited by examiner

*Primary Examiner*—Alessandro Amari
*Assistant Examiner*—Mark Consilvio
(74) *Attorney, Agent, or Firm*—Wilmer Cutler Pickering Hale & Dorr LLP.

(57) ABSTRACT

The present invention relates to a side mirror for an automobile, and more particularly, to a side mirror for an automobile in which an assembled structure is modified such that even in case of an excessive pressing the side mirror to fall in a driver's view, in comparing with pressing a mirror for adjusting to fall in a driver' view as a conventional method, the assembled state is not return to a disassembled state. In accordance with the present invention, an assembly work is easily preformed and further a assemble state is not easily return to a disassemble state by an external force.

1 Claim, 4 Drawing Sheets

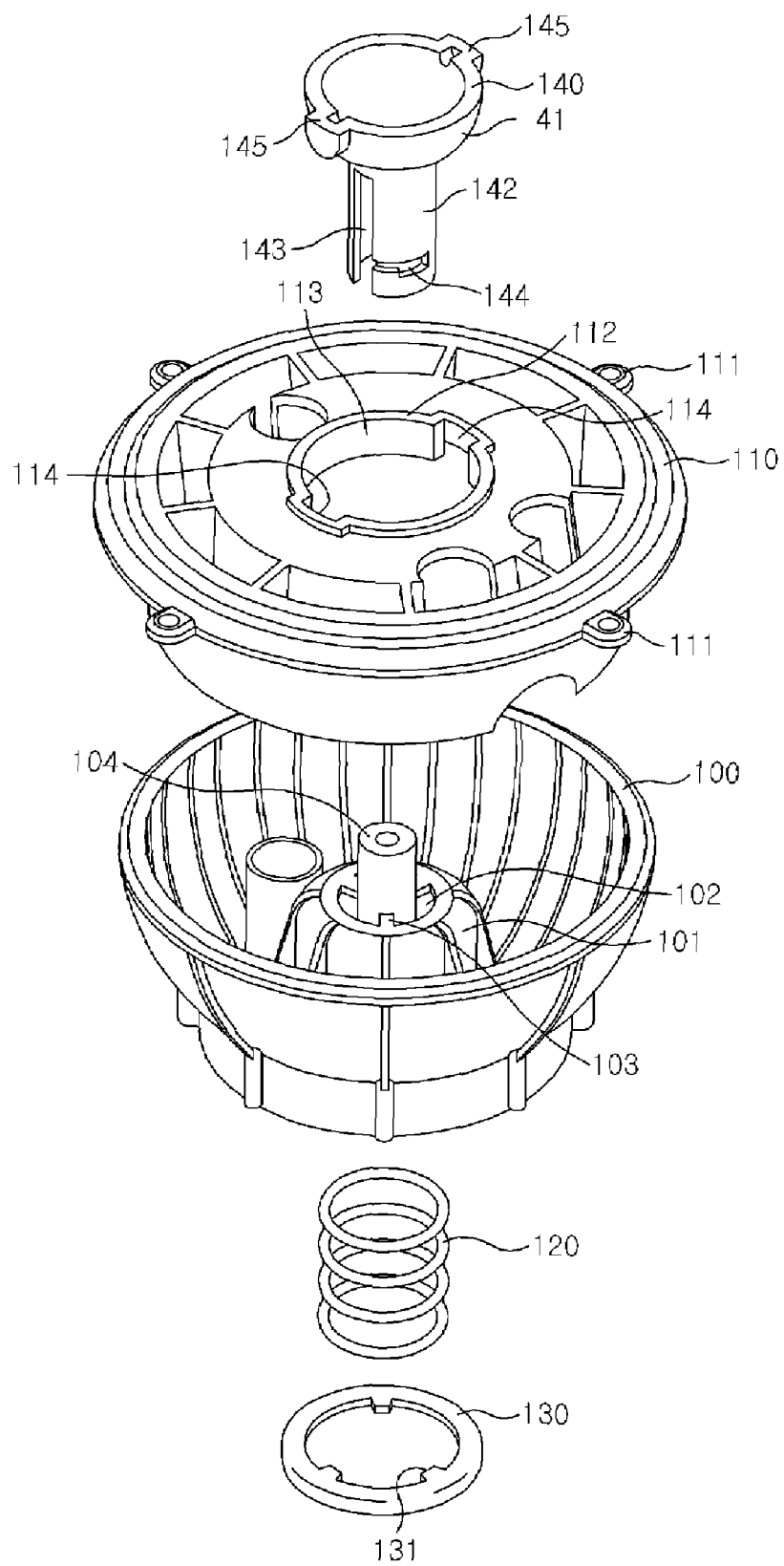
[Fig. 1]

[Fig. 2]
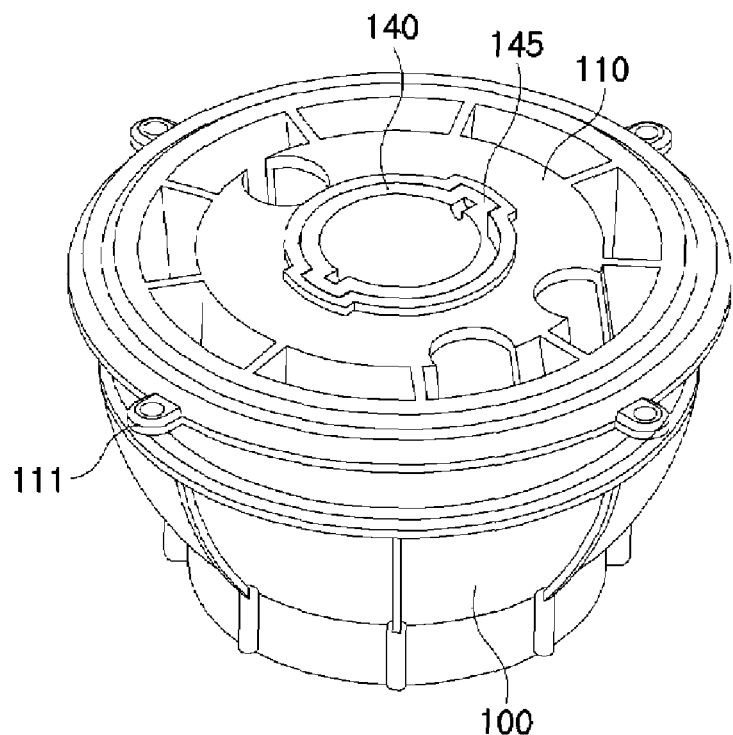
[Fig. 3]
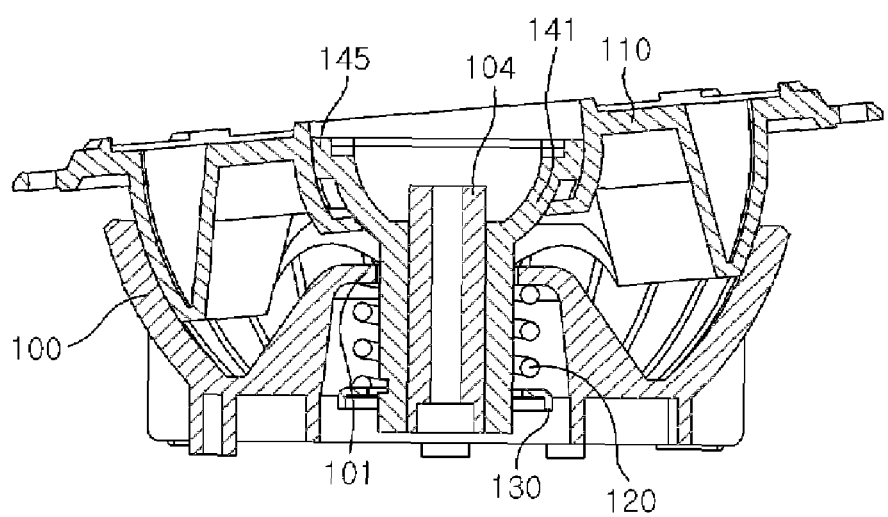

[Fig. 4]
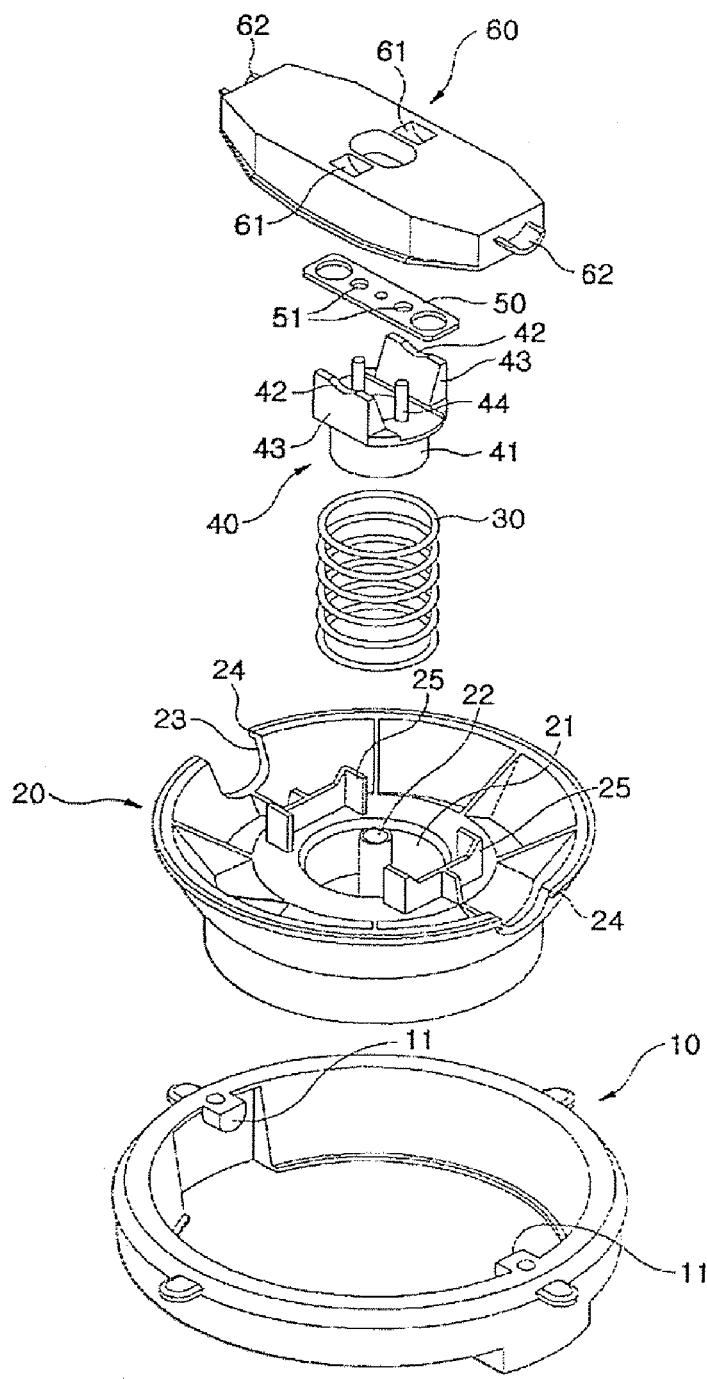
"Conventional Art"

[Fig. 5]
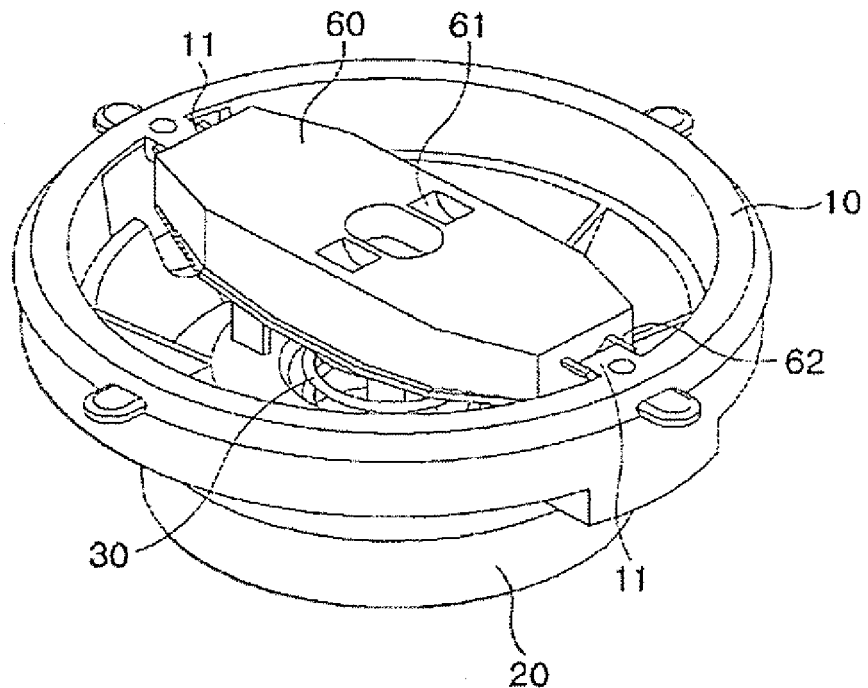
"Conventional Art"

ASSEMBLY STRUCTURE OF SIDE MIRROR FOR AUTOMOBILE

TECHNICAL FIELD

The present invention relates to a side mirror for an automobile, and more particularly, to a side mirror for an automobile in which an assembled structure is modified such that even in case of an excessive pressing the side mirror to fall in a driver's view, in comparing with pressing a mirror for adjusting to fall in a driver' view as a conventional method, the assembled state is not return to a disassembled state.

BACKGROUND ART

As shown in FIGS. 4 and 5, in a conventional side mirror for an automobile, it includes an outer housing 10 the upper part and lower part of which are opened and which is provided with protruding parts for assembling 11 on both upward sides, respectively, of the inner circumferential surface thereof; an inner housing 20 which is configured to insert into the upper part of the outer housing 10, on the center of which a circular groove 21 on a center of which a shaft member 22 is formed with protruding, is formed, on both sides of the outer circumferential surface thereof a pair of semicircular grooves 23 are formed such that the protruding parts for assembling 11 of the outer housing 10 are disposed respectively thereon, and on both upward sides of the outer circumferential surface of which a pair of outer protruding parts 24 are formed outward respectively such that the upper outer circumferential surfaces thereof can not pass through the inner circumferential surface of the lower opening of the outer housing 10; a cylindrical elastic spring 30 that is to be inserted into the intermediate groove 21 of the inner housing 20; a supporting member 40 on the lower part of which a cylinder 41 is formed such that it is to be inserted into the upper part of the elastic spring 30 and the shaft member 22 of the inner housing 20 is to be inserted into the inner circumferential hole thereof, wherein on the upper part of the cylinder 41, a pair of support protruding parts 43 on upper surfaces of which a pair of support grooves 42 are formed in symmetry, are formed respectively; a stopper member 50 in a shape of a long bar on which a plurality of holes 51 into which a plurality of protruding bars 44 formed in protruding between the protruding parts 43 of the supporting member 40 are inserted, are punctured and are to be seated within the rotation preventing strut 25 formed on the outer side of the circular groove 21 of the inner housing 20; and a glass holder plate 60 on the lower surface of which a seat protruding part 61 that is seated in the support groove 42 of the support member 40 is formed downward with protruding and on which a seat supporting shaft 62 that protrudes from the both sides thereof in symmetry and is to be received in the lower circumferential surface of the protruding part for assembling 11 of the outerhousing 10 and seated therein, is formed.

Referring to assembling the side mirror for an automobile as configured in a aforementioned manner, first, the inner housing 20 is inserted through the upper opening of the outer housing 10, the elastic spring 30 is seated in the circular groove 21 of the inner housing 20, the cylinder 41 formed on the lower part of the support member 40 is inserted through the upper part of the elastic spring 30 such that the shaft member 22 is inserted into the inside groove of the cylinder 41, the pair of the protruding bars 44 of the support member 40 are inserted into the holes 51, respectively, of the stopper member 50 and pair of the seat protruding parts 61 of the glass holder plate 60 are seated in the support grooves 42, respectively, of the support protruding part 43 of the support member 40.

Under this state, the upper surface of the glass holder plate 60 is pushed to press the elastic spring 30 and the pair of the seat support shafts 62 formed on both ends of the glass holder plate 60 are seated respectively into the lower circular part of the protruding parts 11 of the outer housing 10.

In the case the side mirror for an automobile is assembled in an aforementioned manner, a driver adjusts manually a side mirror to fall in his sight and at this time, he pushes the glass holder plate 60 attached to the rear surface of the mirror for this purpose.

DISCLOSURE OF INVENTION

Technical Problem

However, in the conventional side mirror for an automobile as configured in an aforementioned manner, referring to the structure in which the inner housing 20 is inserted through the upper side of the outer housing 10, in the case where the glass holder plate 60 is over pushed to adjust the mirror, there arise problems in that the seat support shafts 62 formed on both ends of the glass holder plate 60 are departed from the protrusion parts for assembling 11, respectively, and further that in assembling the side mirror for an automobile, with the glass holder plate 60 being pushed, it is difficult to rotate the outer housing 10 for the protrusion parts for assembling 11 to be seated on the seat support shaft 62 of the glass holder plate 60, thereby lengthening assembling time.

Technical Solution

Accordingly, the present invention has been proposed to solve the above drawbacks, the object of the present invention is to provide a side mirror for an automobile in which an assembly thereof is easily done and a disassembly caused by an external force is not easily done.

Therefore, to achieve the above object, the assembled structure of a side mirror for an automobile includes: a lower housing in a shape of a circular cup having a convex part, three ribs that is formed horizontally on the through hole formed on the upper surface the convex part, and a support bar is formed with protruding upward on the center of the rib; a glass holder plate being configured such that the outer circumferential surface thereof has the same radius of curvature as the inner circumferential surface of the lower housing to be inserted into the inside of the cup shaped-lower housing, and including a plurality of holding holes for holding a side mirror formed on parallel girths on the upper surface, an inserting hole into which the support guide being inserted, on the center of the upper surface, a curved-rib being formed in such a way as to get narrower as proceeding downward on the inner circumferential surface of the inserting hole, and a pair of recess grooves being formed on both sides of the inner circumferential surface of the inserting hole; a support guide including the cup shaped-part being formed in such a way as to be inserted through the inserting hole of the glass holder plate and have the same radius of curvature as the curved-rib, a cylindrical tube being formed vertically on the lower side of the cup shaped-part, three vertical cut off parts being formed in such a way as for the three ribs of the lower housing to be inserted, on the outer circumferential surface of the cylindrical tube, a horizontal cut off groove being formed by cutting off horizontally the lower part of the respective vertical cut off part and provided on the inner side thereof, and a pair of protruding parts being formed on the upper outer circumferential surfaces of the cup shaped-part in such a way as to be inserted into a pair of recess grooves of the inserting hole of the glass holder plate; a spring being inserted into the lower surface of the convex part of the lower housing; and a washer pressing the spring and passing through the vertical cut off part of the cylindrical tube of the support guide disposed on the inside of the spring, wherein the protruding part thereof is seated on the horizontal cut off groove to secure the support guide.

ADVANTAGEOUS EFFECTS

In accordance with the present invention, an assembly work is easily preformed and further a assemble state is not easily return to a disassemble state by an external force.

BRIEF DESCRIPTION OF THE DRAWINGS

FIG. 1 is a perspective exploded view showing a side mirror for an automobile according to the present invention FIG. 2 is a perspective view showing an assembled state of a side mirror for an automobile according to the present invention FIG. 3 is a cross sectional view showing an assembled state of a side mirror for an automobile according to the present invention FIG. 4 is a perspective exploded view showing a conventional side mirror for an automobile and FIG. 5 is a perspective view showing an assembled state of a conventional side mirror for an automobile.

BEST MODE FOR CARRYING OUT THE INVENTION

In the following, the embodiments of the present inventions will be described in detail in conjunction with the accompanying drawings.

FIG. 1 is a perspective exploded view showing a side mirror for an automobile according to the present invention, FIG. 2 is a perspective view showing an assembled state of a side mirror for an automobile according to the present invention, and FIG. 3 is a cross sectional view showing an assembled state of a side mirror for an automobile according to the present invention.

As shown in FIGS. 1 to 3, an assembled structure of a side mirror for an automobile includes a lower housing 100, a glass holder plate 110 that is inserted through the upper part of the lower housing 100 and holds a side mirror, and a support guide 140 that is inserted into the center of the glass holder plate 110 and is connected on the lower surface of the lower housing 100 through a spring 120 and a washer 130 such that the glass holder plate 110 is to be seated on the lower housing 100.

The lower housing 100 is configured in a shape of a circular cup such that on the inside thereof a convex part 101 is formed, a through hole 102 is formed on the upper surface thereof, three ribs 103 are formed horizontally on the through hole 102 and a support bar 104 is formed with protruding upward on the intermediate of the rib 103.

The glass holder plate 110 is configured such that the outer circumferential surface thereof has the same radius of curvature as the inner circumferential surface of the lower housing to be inserted into the inside of the cup shaped-lower housing, a plurality of holding holes 111 for holding a side mirror are formed on the upper parallel girth, an inserting hole 112 into which the support guide 140 is inserted, is formed on the center of the upper surface, a curved-rib 113 is formed in such a way as to get narrower as proceeding downward on the inner circumferential surface of the inserting hole 112, and a pair of recess grooves are formed on both sides of the inner circumferential surface of the inserting hole 112.

The support guide 140 is configured such that a cup shaped-part 141 is formed in such a way as to be inserted through the inserting hole 112 of the glass holder plate 110 and have the same radius of curvature as the curved-rib 113, a cylindrical tube 142 is formed vertically on the lower side of the cup shaped-part 141, three cut off parts 143 are formed vertically on the outer circumferential surface in such a way as for the three ribs 103 of the lower housing 100 to be inserted, a horizontal cut off groove 144 formed by cutting off horizontally the lower part of the respective vertical cut off part 143 is provided on the inner side thereof such that the washer 130 and the protruding part 131 of the inner circumferential surface are to be inserted respectively, a pair of protruding parts 145 are formed on the upper outer circumferential surfaces of the cup shaped-part 141 respectively such that they are to be inserted into a pair of recess grooves 114 of the inserting hole of the glass holder plate 110, and the outer surface is curved to contact with the curved surface formed on the inner circumferential surface of the recess groove 114.

In the following, the operations and effects of the side mirror for an automobile according to the present invention will be described. First, referring procedures of assembling the side mirror for an automobile, the glass holder plate 110 is seated on the cup shaped-lower housing 100, and the protruding part 145 of the support guide 140 is inserted into the recess groove 114 of the inserting hole 112 through the inserting hole 112 of the glass holder plate 110, and the rib 103 formed on the upper surface of the convex part 101 of the lower housing 100 is inserted into the vertical cut off part 143 of the support guide 140. Under the state of the support guide 140 being inserted, the lower housing 100 is inverted for the spring 120 to be inserted into a concave part on the lower surface of the convex part 101, that is, the spring 120 is inserted such that the cylindrical tube 142 of the support guide 140 is disposed the inside of the spring 120 and the washer 130 is inserted with pressing the spring 120, wherein the three protruding parts 131 on the inner circumferential surface are inserted into respectively the vertical cut off parts 143 of the support guide 140 and then rotated horizontally such that the protruding parts 131 of the washer 130 the horizontal cut off grooves 144 to complete the assembly.

The cup shaped part 141 of the support guide 140 seated on the inserting hole 112 of the glass holder plate 110 is configured not to depart downward by the curved rib 113 of the inserting hole 112. In pressing the side mirror attached on the upper surface of the glass holder plate 110 to fall in a driver's view, the glass holder plate 110 is pressed in any directions such that the cup shaped-part 142 of the support guide 140 is contact with the curved rib 113 to adjust a inclination, as shown in FIG. 3, and further the glass holder plate 110 is pressed to adjust the inclination to fall in a driver's view, since the lower outer circumferential surface of the glass holder plate 110 has the same curvature as the inner circumferential surface of the cup shaped-part of the lower housing 100.

Meanwhile, even though a driver presses excessively the glass holder plate, an assembled state is not return to a disassembled state and further an assembly work thereof can be easily done.

According to an assembled structure of a side mirror for an automobile as configured in a aforementioned manner, it includes the lower housing 100, the glass holder plate 110 that is inserted into the upper side of the lower housing 100 and holds the side mirror, and a support guide 140 that is inserted into the upper surface and intermediate part of the lower housing 100 and makes the glass holder plate 110 to be seated on the lower housing 100 by a connection to the lower surface of the lower housing through the spring 120 and the washer 130, and thus even though a driver presses excessively the glass holder plate, a assembled state is not return to a disassembled state and further an assembly work thereof can be easily done.

INDUSTRIAL APPLICABILITY

It will be apparent to those skilled in the art that various modification and variations can be made in the reinforcing structure for a corrugated steel plate of the present invention. Thus, it is intended that the present invention cover the modifications and variations of this invention provided that they come within the scope of the appended claims and their equivalents.

The invention claimed is:

1. A side mirror for an automobile including: a lower housing (100) in a shape of a circular cup having a convex part (101), three ribs (103) that is formed horizontally on the through hole (102) formed on the upper surface the convex part (101), and a support bar (104) is formed with protruding upward on the center of the rib (103); a glass holder plate (110) being configured such that the outer circumferential surface thereof has the same radius of curvature as the inner circumferential surface of the lower housing (100) to be inserted into the inside of the cup-shaped lower housing (100), and including a plurality of holding holes (111) for holding a side mirror formed on parallel girths on the upper surface, an inserting hole (112) into which the support guide (140) being inserted, on the center of the upper surface, a curved rib (113) being formed in such a way as to get narrower as proceeding downward on the inner circumferential surface of the inserting hole (112), and a pair of recess grooves (114) being formed on both sides of the inner circumferential surface of the inserting hole (112); a support guide (140) including the cup-shaped part (141) being formed in such a way as to be inserted through the inserting hole (112) of the glass holder plate (110) and have the same radius of curvature as the curved rib (113), a cylindrical tube (142) being formed vertically on the lower side of the cup-shaped part (141), three vertical cut-off parts (143) being formed in such a way as for the three ribs (103) of the lower housing (100) to be inserted, on the outer circumferential surface of the cylindrical tube (142), a horizontal cut-off groove (144) being formed by cutting off horizontally the lower part of the respective vertical cut-off part (143) and provided on the inner side thereof, and a pair of protruding parts (145) being formed on the upper outer circumferential surfaces of the cup-shaped part (141) in such a way as to be inserted into a pair of recess grooves (114) of the inserting hole (112) of the glass holder plate (110); a spring (120) being inserted into the lower surface of the convex part (101) of the lower housing (100); and a washer (130) pressing the spring (120) and passing through the vertical cut-off part (143) of the cylindrical tube (142) of the support guide (140) disposed on the inside of the spring (120), wherein the protruding part (131) thereof is seated on the horizontal cut-off groove (144) to secure the support guide (140).

* * * * *